United States Patent

[11] 3,624,127

[72] Inventors Philip E. Shaw
  Winter Haven, Fla.;
  Sol J. Daum, Albany; Robert L. Clarke,
  Bethlehem, N.Y.
[21] Appl. No. 585,759
[22] Filed Oct. 11, 1966
[45] Patented Nov. 30, 1971
[73] Assignee Sterling Drug Inc.
  New York, N.Y.

[54] BASIC ESTERS OF CYCLOHEXYLIDENEACETIC ACIDS AND INTERMEDIATES
  7 Claims, No Drawings
[52] U.S. Cl. .................................................... 260/468 R,
  260/247.2 B, 260/294.3 E, 260/295 CA,
  260/295.5 R, 260/469 R, 260/471 R, 260/472 R,
  260/473 G, 260/476 R, 260/477 R, 260/514 R,
  260/521 A, 260/526 R, 260/540 R, 424/305
[51] Int. Cl. ....................................................... C07c 69/74
[50] Field of Search ............................................ 260/468,
  514, 295.5, 247.2, 471, 476, 472, 473, 521, 526,
  540, 477

[56] References Cited
FOREIGN PATENTS

| 6,505,232 | 10/1965 | Netherlands | 260/468 |
| 1,429,993 | 1/1966 | France | 260/468 |
| 1,439,315 | 4/1966 | France | 260/468 |

Primary Examiner—Lewis Gotts
Assistant Examiner—Paul J. Killos
Attorneys—Elmer J. Lawson, B. Woodrow Wyatt, Thomas L. Johnson, Robert K. Bair, R. Clifford Bourgeois, William G. Webb and Roger T. Wolfe ABSTRACT: Cyclohexanone, optionally substituted in the 2-position by lower-alkyl and/or in the 4-position by hydroxy or acyloxy, reacts with a trilower-alkyl α-phosphono-lower-alkanoate to give a lower-alkyl Δ¹, -cyclohexaneacetate or corresponding derivative thereof. The latter is hydrolyzed to the free acid, which, via the acid chloride, is esterified with an amino-lower-alkanol, giving basic esters having cardiovascular and antidepressant properties.

BASIC ESTERS OF CYCLOHEXYLIDENEACETIC ACIDS AND INTERMEDIATES

This invention relates to monocyclic substituted acids and esters thereof, and is in particular concerned with basic esters of substituted cyclohexylideneacetic acids and with intermediates therefor.

The compounds of the invention are of the formula

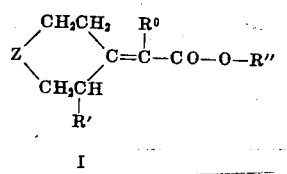

I wherein R is amino-lower-alkyl; R° and R' are hydrogen or lower-alkyl; and Z is $CH_2$, $O=C$, (HO)CH, or (acylO)CH.

The term "lower-alkyl" used above in defining the groups R, R' and R° stands for alkyl groups having up to about six carbon atoms, including such groups as methyl, ethyl, propyl, isopropyl, butyl, hexyl, and the like.

When R in formula I stands for an amino-lower-alkyl group, it represents a lower-alkyl group substituted by a basic amino group. The exact nature of the basic amino moiety is not critical, although it is preferred that it have a molecular weight less than about 200. A particularly preferred type of amino-lower-alkyl group has the structure —Y—N=B wherein Y is lower-alkylene of two to five carbon atoms and N=B is unsubstituted amino, lower-alkylamino, di-lower-alkylamino, polymethylenimino of five to seven ring carbons and lower-alkylated derivatives thereof, 4-morpholinyl and lower-alkylated derivatives thereof, or 1-piperazinyl and lower-alkylated derivatives thereof. The term "lower-alkyl" as used in defining portions of the amino moiety N=B stands for alkyl groups having up to about six carbon atoms.

When Z in formula I above stands for (acylO)CH, the acyl groups are carboxylic acyl groups having from one to 12 carbon atoms and molecular weights less than about 250. Representative of the lower-carboxylic acyl radicals which can be present are lower-alkanoyl, e.g., acetyl, propionyl, isobutyryl, caproyl, heptanoyl, octanoyl, dodecanoyl, trimethylacetyl, and the like; cycloalkyl-lower-alkanoyl wherein cycloalkyl has five to six ring members, e.g., β-cyclopentylpropionyl, β-cyclohexylpropionyl, and the like; benzoyl; phenyl-lower-alkanoyl or -alkenoyl, e.g., phenylacetyl, β-phenylpropionyl, cinnamoyl, and the like; phenoxy-lower-alkanoyl, e.g., p-chlorophenoxyacetyl; carbamyl, including unsubstituted carbamyl, N-lower-alkylcarbamyl, N-phenylcarbamyl and N,N-di-lower-alkylcarbamyl; and pyridylcarbonyl, e.g., nicotinoyl and isonicotinoyl. In acyl radicals containing a phenyl group, the benzene ring thereof can be unsubstituted or substituted by any number and kind of substituents inert under the reaction conditions used, including lower-alkyl, e.g., p-tolyl; lower-alkoxy, e.g., 3,4-dimethoxy-phenyl; halogen (including fluorine, chlorine, bromine and iodine), e.g., 2-bromophenyl; and nitro, e.g., p-nitrophenyl. The lower-alkyl and lower-alkoxy groups preferably have from one to four carbon atoms.

The compounds of formula I are prepared by esterification of compounds of the formula

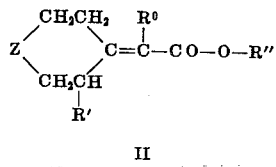

II wherein R°, R' and Z have the meanings given above and R" is hydrogen, by employing the appropriate amino-lower-alkanol or amino-lower-alkyl halide.

A preferred method comprises reacting the acid halide (e.g., chloride or bromide) of a free acid of formula II with a tertiary-amino-lower-alkanol, although an alternative procedure involves reacting an alkali metal salt (e.g., sodium salt) of the acid with an amino-lower-alkyl halide (e.g., chloride or bromide). Surprisingly, the acid halide process can be used even in the presence of a free hydroxy group [Z (HO)CH]. It appears that if reaction does occur at the hydroxy group during acid chloride formation, the hydroxy group is regenerated during the preparation of the basic ester.

The compounds of formula II wherein R" is hydrogen are in turn prepared by alkaline hydrolysis of the compounds of formula II wherein R" is lower-alkyl.

The compounds of formula II wherein R" is lower-alkyl and Z is $CH_2$, (HO)CH or (acylO)CH are in turn prepared by reacting a compound of the formula

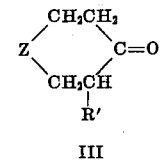

III wherein R' is hydrogen or lower-alkyl and Z is $CH_2$, (HO)CH or (acylO)CH with a tri-lower-alkyl α-phosphono-lower-alkanoate of the formula

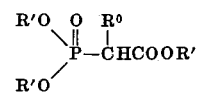

in the presence of a basic compound capable of acting as a proton acceptor. Examples of such basic compounds are alkali metal alkoxides, amides or hydrides, e.g., sodium methoxide, sodium amide or sodium hydride, and the reaction is preferably carried out in nonaqueous medium at ordinary temperatures.

The compounds of formula II wherein R" is lower-alkyl and Z is O=C are prepared by oxidation of the corresponding compound wherein Z is (HO)CH, as by the action of chromic acid in pyridine solution.

The structures of the compounds of the invention were established by the modes of synthesis, by elementary analysis, by interpretation of their infrared, ultraviolet and NMR spectra, and by their behavior in thin layer chromatography (TLC) and gas-liquid phase chromatography (glpc).

The compounds of formula I are basic in nature and form acid-addition salts with moderate to strong inorganic or organic acids. Said acid-addition salt forms are within the purview of the invention and are considered the full equivalents of the corresponding free bases. For pharmacological purposes it is preferred to use water-soluble, pharmaceutically acceptable acid-addition salts, although all acid-addition salts are useful as characterizing derivatives of and as intermediates in the purification of the free bases.

Pharmacological evaluation of the basic ester compounds of the invention has shown that they possess cardiovascular activity. They caused a decrease in the heart rate and contractile force in the isolated rabbit heart at dose levels of 50-100 gamma. There was also observed an antidepressant action in the compounds when tested for their ability to reverse reserpine induced ptosis in mice. The compounds are prepared for use in the form of a sterile aqueous solution of a water-soluble, pharmaceutically acceptable acid-addition salt.

Chemotherapeutic evaluation has shown that the compounds of formula I also possess antibacterial and antifungal activity when tested in vitro against the organisms *Staph. aureus, E. typhi, Cl. welchii, As. niger, M. albicans* and the like.

The following examples will further illustrate the invention without the latter being limited thereby.

EXAMPLE 1

Ethyl 4-hydroxy-Δ$^{1,α}$-cyclohexaneacetate [II; R" is $C_2H_5$, R° and R' are H, Z is (HO)CH]

Sodium hydride (9.80 g., 50 percent in oil) was added to 400 ml. of dry dimethylformamide and cooled at 20° C. To this mixture 45.6 g. of triethyl phosphonoacetate was added dropwise while holding the temperature below 20° C. When the addition was completed, the mixture was stirred for 1 hour at room temperature, and then 24.16 g. of 4-hydroxycyclohexanone was added dropwise while holding the temperature below 30° C. About 1 hour after the addition of the 4-hydroxycyclohexanone was completed, 1,600 ml. of water was added and the mixture was extracted with ether. The ether extracts were washed with sodium chloride solution, dried over anhydrous sodium sulfate and evaporated on a steam bath. The residue was distilled and the portion which boiled at 114°–142 °C. (0.1 mm.) was collected. The latter was chromatographed on 800 g. of silica gel using 1:1 ether-pentane for elution. The eluted product was distilled to give 26.0 g. of ethyl 4-hydroxy-$\Delta^{1,\alpha}$-cyclohexaneacetate, b.p. 119°–121° C. (0.3 mm.).

Similarly, cyclohexanone and 2-methylcyclohexanone reacted with triethyl phosphonoacetate to give ethyl $\Delta^{1,\alpha}$-cyclohexaneacetate and ethyl 2-methyl-$\Delta^{1,\alpha}$-cyclohexaneacetate, respectively.

By replacing the triethyl phosphonoacetate in the foregoing preparation by a molar equivalent amount of trimethyl α-phosphonopropionate or trimethyl α-phosphono-valerate, there can be obtained, respectively, methyl 4-hydroxy-$\Delta^{1,}$-cyclohexanepropionate [II; R″ and R° are CH$_3$, R′ is H, Z is (HO)CH] or methyl 4-hydroxy-$\Delta^{1,\alpha}$-cyclo-hexanevalerate [II; R″ is CH$_3$, R° is C$_3$H$_7$, R′ is H, Z is (HO)CH].

Ethyl 4-hydroxy-$\Delta^{1,\alpha}$-cyclohexaneacetate can be caused to react with acetic anhydride in pyridine to give ethyl 4-acetoxy-$\Delta^{1,\alpha}$-cyclohexaneacetate [II; R″ is C$_2$H$_5$, R° and R′ are H, Z is (CH$_3$COO)CH].

Ethyl 4-hydroxy-$\Delta^{1,\alpha}$-cyclohexaneacetate can be oxidized by treating it with chromic oxide in pyridine solution to give ethyl 4-oxo-$\Delta^{1,\alpha}$-cyclohexaneacetate [II; R″ is C$_2$H$_5$, R° and R′ are H, Z is O=C].

Ethyl 4-hydroxy-$\Delta^{1,\alpha}$-cyclohexaneacetate can be caused to react with phenyl isocyanate to give ethyl 4-(N-phenylcarbamoyloxy)-$\Delta^{1,\alpha}$-cyclohexaneacetate [II; R″ is C$_2$H$_5$, R° and R′ are H, Z is (C$_6$H$_5$NHCOO)CH].

EXAMPLE 2

4-Hydroxy-$\Delta^{1,\alpha}$-cyclohexaneacetic acid [II; R″, R° and R′ are H, Z is (HO)CH]

A mixture of 21.65 g. of ethyl 4-hydroxy-$\Delta^{1,\alpha}$-cyclohexaneacetate, 360 ml. of ethanol and 90 ml. of 2N sodium hydroxide was refluxed for 90 minutes. The solvent was removed in vacuo and the residue was partitioned between water and ether. The aqueous layer was acidified with 6N hydrochloric acid. The product which separated was collected and recrystallized from ethyl acetate to give 4-hydroxy-$\Delta^{1,\alpha}$-cyclohexaneacetic acid, m.p. 150°–152° C.

Similarly, ethyl $\Delta^{1,}$-cyclohexaneacetate and ethyl 2-methyl-$\Delta^{1,\alpha}$-cyclohexaneacetate were hydrolyzed to give $\Delta^{1,\alpha}$-cyclohexaneacetic acid and 2-methyl-$\Delta^{1,\alpha}$-cyclohexane-acetic acid, respectively.

The following acids can also be prepared by similar hydrolysis of the corresponding lower-alkyl esters:

4-Hydroxy-$\Delta^{1,\alpha}$-cyclohexanepropionic acid [II; R″ is H, R° is CH$_3$, R′ is H, Z is (HO)CH], 4-Hydroxy-$\Delta^{1,\alpha}$-cyclohexanevaleric acid [II; R′ is H, R° is C$_3$H$_7$, R′ is H, Z is (HO)CH], 4-Oxo-$\Delta^{1,\alpha}$-cyclohexaneacetic acid [II; R″, R° and R′ are H, Z is O=C], 4-(N-Phenylcarbamoyloxy)-$\Delta^{1,\alpha}$-cyclohexaneacetic acid [II; R″, R° and R′ are H, Z is (C$_6$H$_5$NHCOO)CH].

EXAMPLE 3

2-Dimethylaminoethyl 4-hydroxy-$\Delta^{1,}$-cyclohexaneacetate [I; R is CH$_2$CH$_2$N(CH$_3$)$_2$, R° and R′ are H, Z is (HO)CH]

4-Hydroxy-$\Delta^{1,\alpha}$-cyclohexaneacetic acid (16.5 g.) was dissolved in 100 ml. of methanol, 53 ml. of 2N sodium hydroxide was added, and the mixture was evaporated to dryness in vacuo on a steam bath. Dry benzene (50 ml.) was added to the residue, the mixture concentrated to dryness, and this procedure was repeated twice more to ensure absence of water. Dry benzene (50 ml.) was introduced, and to the stirred mixture was added 39 ml. of oxalyl chloride dropwise with occasional cooling of the reaction mixture. After the addition was completed, the mixture was kept at room temperature for about 45 minutes and the solvent was then removed in vacuo at below 50° C. To the residue was added 50 ml. of dry benzene followed by dropwise addition of 49 g. of 2-dimethylaminoethanol while the mixture was stirred and cooled. The reaction mixture was then warmed to about 50° C. for 30 minutes, cooled to room temperature, and 200 ml. of 2N ammonium hydroxide and 60 g. of sodium chloride were added. The mixture was extracted with ether, and the ether extracts were dried over anhydrous sodium sulfate and concentrated. The product was purified in two portions by partition chromatography using 360 g. of infusorial earth for each portion. There was thus obtained 2-dimethylaminoethyl 4-hydroxy-$\Delta^{1,\alpha}$-cyclohexaneacetate in the form of its hydrochloride salt, colorless needles, m.p. 163.5°–166° C. when recrystallized from acetonitrile.

By replacing the 2-dimethylaminoethanol in the foregoing preparation by a molar equivalent amount of 3-dibutylaminopropanol, 2-(1-piperidyl)ethanol, 2-(1-pyrrolidyl)ethanol, 2-(4-morpholinyl)ethanol, 2-(4-methyl-1-piperidyl)ethanol, or 2-(4-methyl-1-piperazinyl)ethanol, there can be obtained respectively, 3-dibutylaminopropyl-4-hydroxy-$\Delta^{1,\alpha}$-cyclohexaneacetate [I; R is CH$_2$CH$_2$CH$_2$N(C$_4$H$_9$)$_2$, R° and R′ are H, Z is (HO)CH], 2-(1-piperidyl)ethyl 4-hydroxy-$\Delta^{1,\alpha}$-cyclohexaneacetate [I; R is CH$_2$CH$_2$N(CH$_2$)$_5$, R° and R′ are H, Z is (HO)CH], 2-(1-pyrrolidyl)ethyl 4-hydroxy-$\Delta^{1,\alpha}$-cyclohexaneacetate [I; R is CH$_2$CH$_2$N(CH$_2$)$_4$, R° and R′ are H, Z is (HO)CH], 2-(4-morpholinyl)ethyl 4-hydroxy-$\Delta^{1,\alpha}$-cyclohexaneacetate [I; R is CH$_2$CH$_2$N(CH$_2$)$_4$O, R° and R′ are H, Z is (HO)CH], 2-(4-methyl-1-piperidyl)ethyl 4-hydroxy-$\Delta^{1,\alpha}$-cyclohexaneacetate [I; R is CH$_2$CH$_2$N(CH$_2$)$_4$CHCH$_3$, R° and R′ are H, Z is (HO)CH], or 2-(4-methyl-1-piperazinyl)ethyl 4-hydroxy-$\Delta^{1,}$-cyclohexaneacetate [I; R is CH$_2$CH$_2$N(CH$_2$)$_4$NCH$_3$, R° and R′ are H, Z is (HO)CH].

Similarly, 4-hydroxy-$\Delta^{1,\alpha}$-cyclohexanepropionic acid, 4-hydroxy-$\Delta^{1,\alpha}$-cyclohexanevaleric acid, 4-oxo-$\Delta^{1,\alpha}$-cyclohexaneacetic acid or 4-(N-phenylcarbamoyloxy)-$\Delta^{1,\alpha}$-cyclohexaneacetic acid can be esterified to give, respectively, 2-dimethylaminoethyl 4-hydroxy-$\Delta^{1,\alpha}$-cyclohexanepropionate [I; R is CH$_2$CH$_2$N(CH$_3$)$_2$, R° is CH$_3$, R′ is H, Z is (HO)CH], 2-dimethylaminoethyl 4-hydroxy-$\Delta^{1,r}$-cyclohexanevalerate [I; R is CH$_2$CH$_2$N(CH$_3$)$_2$, R° is C$_3$H$_7$, R′ is H, Z is (HO)CH], 2-diethylaminoethyl 4-oxo-$\Delta^{1,}$-cyclohexaneacetate [I; R is CH$_2$CH$_2$N(CH$_3$)$_2$, R° and R′ are H, Z is O=C], or 2-diethylaminoethyl 4-(N-phenylcarbamoyloxy)-$\Delta^{1,\alpha}$-cyclohexaneacetate [I; R is CH$_2$CH$_2$N(CH$_3$)$_2$, R° and R′ are H, Z is (C$_6$H$_5$NHCOO)CH].

2-Dimethylaminoethyl 4-hydroxy-$\Delta^{1,\alpha}$-cyclohexanepropionate can be caused to react with acetic anhydride, caproyl chloride, benzoyl chloride, p-methoxybenzoyl chloride, β-cyclopentylpropionyl chloride, cinnamoyl chloride or nicotinoyl chloride in pyridine solution to give, respectively, the 4-acetate, 4-caproate, 4-benzoate, 4-(p-methoxybenzoate) 4-(β-cyclopentylpropionate), 4-cinnamate or 4-nicotinate of 2-dimethylaminoethyl 4-hydroxy-$\Delta^{1,\alpha}$-cyclohexanepropionate.

EXAMPLE 4

2-Dimethylaminoethyl $\Delta^{1,\alpha}$-cyclohexaneacetate [I; R is CH$_2$CH$_2$N(CH$_3$)$_2$, R′ and R° are H, Z is CH$_2$]

A solution of 31.0 g. (0.221 mole) of $\Delta^{1,\alpha}$-cyclohexaneacetic acid in 300 ml. of dry benzene was treated with 60 ml. of thionyl chloride and heated under reflux for 2 hours.

The solvents were removed by warming under reduced pressure and the residue was dissolved in 300 ml. of dry benzene. 2-Dimethylaminoethanol (60 ml.) was added dropwise with stirring and cooling and the resulting mixture was then heated under reflux for 2 hours. The mixture was cooled, diluted with 2 liters of ether and extracted twice with 2N hydrochloric acid, the second extracts being strongly acidic. The combined extracts were made alkaline with 35 percent sodium hydroxide with cooling and the liberated base was extracted with ether. These ether extracts were washed with water and brine, dried (MgSO$_4$) and concentrated to give 37.3 g. of brown, oily basic ester. A solution of this oil in 500 ml. of ether was treated with 20.4 ml. of 8.7N ethanolic hydrogen chloride and the precipitate was collected and recrystallized from acetone to give 35.0 g. (64 percent) of 2-dimethylaminoethyl $\Delta^{1,\alpha}$ cyclohexaneacetate in the form of its hydrochloride salt, m.p. 172°–174° C. One further recrystallization from acetone gave a sample with the m.p. 173°–174° C.

EXAMPLE 5

2-Dimethylaminoethyl 2-methyl-$\Delta^{1,\alpha}$-cyclohexaneacetate [I; R is CH$_2$CH$_2$N(CH$_3$)$_2$, R' is CH$_3$, R° is H, Z is CH$_2$] was prepared from 2-methyl-$\Delta^{1,\alpha}$-cyclohexaneacetic acid and 2-dimethylaminoethanol by the procedure described above in example 4. There was thus obtained 2-dimethylaminoethyl 2-methyl-$\Delta^{1,\alpha}$-cyclohexaneacetate in the form of its hydrochloride salt, m.p. 129°–131° C. (needle clusters from acetone).

4-Hydroxy-$\Delta^{1,\alpha}$-cyclohexaneacetic acid can be converted to the sodium salt with one equivalent of sodium methoxide in dimethylsulfoxide solution, and said sodium salt then caused to react with benzyl 2-bromoethylcarbamate or benzyl (N-methyl)-2-bromoethylcarbamate to give, respectively, 2-(carbobenzoxyamino)-ethyl 4-hydroxy-$\Delta^{1,\alpha}$-cyclohexaneacetate or 2-[carbobenzoxy-(N-methyl)-amino]-ethyl 4-hydroxy-$\Delta^{1,\alpha}$-cyclohexaneacetate. The latter two compounds, when treated with trifluoroacetic acid, one day at room temperature, can be converted, respectively, to 2-aminoethyl 4-hydroxy-$\Delta^{1,\alpha}$-cyclohexaneacetate [I; R is CH$_2$CH$_2$NH$_2$, R° and R' are H, Z is (HO)CH], or 2-methylaminoethyl 4-hydroxy-$\Delta^{1,\alpha}$-cyclohexaneacetate [I; R is CH$_2$CH$_2$NHCH$_3$, R° and R' are H, Z is (HO)CH].

We claim:
1. A compound of the formula

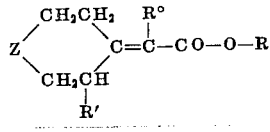

wherein R is amino-lower-alkyl, R° and R' are hydrogen or lower-alkyl; and Z is CH$_2$, O=C, (HO)CH or (acylO)CH, acyl being selected from the group consisting of lower-alkanoyl of up to 12 carbon atoms, cycloalkyl-lower-alkanoyl wherein cycloalkyl has five to six ring members, benzoyl, phenyl-lower-alkanoyl, phenyl-lower-alkenoyl, phenoxy-lower-alkanoyl, carbamyl, N-lower-alkylcarbamyl, N-phenylcarbamyl, N,N-di-lower-alkylcarbamyl, nicotinoyl and isonicotinoyl, and wherein the phenyl group of any of the acyls can be unsubstituted or substituted by lower-alkyl, lower-alkoxy, halogen or nitro.

2. 2-Dimethylaminoethyl $\Delta^{1,\alpha}$-cyclohexaneacetate, according to claim 1, wherein R is 2-dimethylaminoethyl, R° and R' are hydrogen and Z is CH$_2$.

3. 2-Dimethylaminoethyl 2-methyl-$\Delta^{1,\alpha}$-cyclohexaneacetate, according to claim 1, wherein R is 2-dimethylaminoethyl, R° is hydrogen, R' is methyl and Z is CH$_2$.

4. 2-Dimethylaminoethyl 4-hydroxy-$\Delta^{1,\alpha}$-cyclohexaneacetate, according to claim 1, wherein R is 2-dimethylaminoethyl, R° and R' are hydrogen and Z is (HO)CH.

5. A compound of the formula

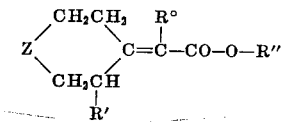

wherein R°, R' and R'' are hydrogen or lower-alkyl, and Z is O C, (HO)CH or (acylO)CH, acyl being selected from the group consisting of lower-alkanoyl of up to 12 carbon atoms, cycloalkyl-lower-alkanoyl wherein cycloalkyl has five to six ring members, benzoyl, phenyl-lower-alkanoyl, phenyl-lower-alkenoyl, phenoxy-lower-alkanoyl, carbamyl, N-lower-alkylcarbamyl, N-phenylcarbamyl, N,N-di-lower-alkylcarbamyl, nicotinoyl and isonicotinoyl, and wherein the phenyl group of any of the acyls can be unsubstituted or substituted by lower-alkyl, lower-alkoxy, halogen or nitro.

6. Lower-alkyl 4-hydroxy-$\Delta^{1,\alpha}$-cyclohexaneacetate, according to claim 5, wherein R° and R' are hydrogen, R'' is lower-alkyl and Z is (HO)CH.

7. 4-Hydroxy-$\Delta^{1,\alpha}$-cyclohexaneacetic acid, according to claim 5, wherein R°, R' and R'' are hydrogen and Z is (HO)CH.

* * * * *

PO-1050
(5/69)

UNITED STATES PATENT OFFICE
CERTIFICATE OF CORRECTION

Patent No. 3,624,127     Dated November 30, 1971

Inventor(s) Philip E. Shaw, Sol J. Daum and Robert L. Clarke

It is certified that error appears in the above-identified patent and that said Letters Patent are hereby corrected as shown below:

Cover page, second column, line 4 of abstract, "$\Delta^1$, -" should read --$\Delta^{1,\alpha}$- --.

Column 1, in formula I, " R" " should read --R--.

Column 3, line 26, line 57, line 74 and Column 4, line 44, line 52 and line 54, "$\Delta^1$, -" should read --$\Delta^{1,\alpha}$- -- (each occurrence).

Column 3, line 65, " R' " should read --R"--.

Column 6, line 34, Claim 5, "O" should read --O= --.

Signed and sealed this 30th day of May 1972.

(SEAL)
Attest:

EDWARD M. FLETCHER, JR.
Attesting Officer

ROBERT GOTTSCHALK
Commissioner of Patents